(12) United States Patent
Schaaf et al.

(10) Patent No.: US 6,355,176 B1
(45) Date of Patent: *Mar. 12, 2002

(54) MAGNETIC APPARATUS FOR COLLECTING, CONVEYING AND RELEASING MAGNETIC MATERIALS AND METHOD

(75) Inventors: William R. Schaaf, Greer; Ray R. Arel, Anderson; Donald L. Smith, Greenville, all of SC (US)

(73) Assignee: Insul-Magnetics, Incorporated, Taylors, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,111

(22) Filed: Mar. 31, 2000

Related U.S. Application Data

(63) Continuation-in-part of application No. 09/046,756, filed on Mar. 24, 1998, now Pat. No. 6,056,879.

(51) Int. Cl.[7] ................................................. B01D 35/06

(52) U.S. Cl. ...................... 210/695; 210/222; 209/39; 209/223.2; 209/226; 209/227; 209/228

(58) Field of Search .................................. 210/695, 222; 209/217–218, 8, 214, 226–227, 636, 630, 39, 223.2, 225, 232, 230, 219, 228

(56) References Cited

U.S. PATENT DOCUMENTS

| 2,642,994 A | * | 6/1953 | Casson |
| 2,792,115 A | * | 5/1957 | Medearis |
| 4,544,060 A | * | 10/1985 | Enomoto |
| 4,867,869 A | * | 9/1989 | Barrett |
| 5,043,063 A | * | 8/1991 | Latimer .................... 210/222 |
| 5,470,466 A | * | 11/1995 | Schaaf ...................... 210/222 |
| 6,056,879 A | * | 5/2000 | Schaaf et al. .............. 210/695 |
| 6,077,333 A | * | 6/2000 | Wolfs |

* cited by examiner

Primary Examiner—Matthew O. Savage
Assistant Examiner—Marianne Ocampo
(74) Attorney, Agent, or Firm—Ralph Bailey, P.A.

(57) ABSTRACT

An assembly and method for collecting and releasing magnetic materials includes an elongated permanent magnet (A) within an elongated cover (B) constructed from non-magnetic material for providing a collection area for the magnetic materials thereon opposite the magnet. Apparatus (C) separates the magnet to a more remote position in relation to the collection area for releasing magnetic materials from the elongated cover. The magnet and the cover may be moved while in superposed closely adjacent relation for collecting magnetic material and thereafter separated for releasing magnetic material collected on the cover. A driven conveyor (D) may be included Ln the assembly for transporting the magnet and the cover through a coolant liquid containing magnetic materials in the form of particulate matter formed during a machining operation.

2 Claims, 2 Drawing Sheets

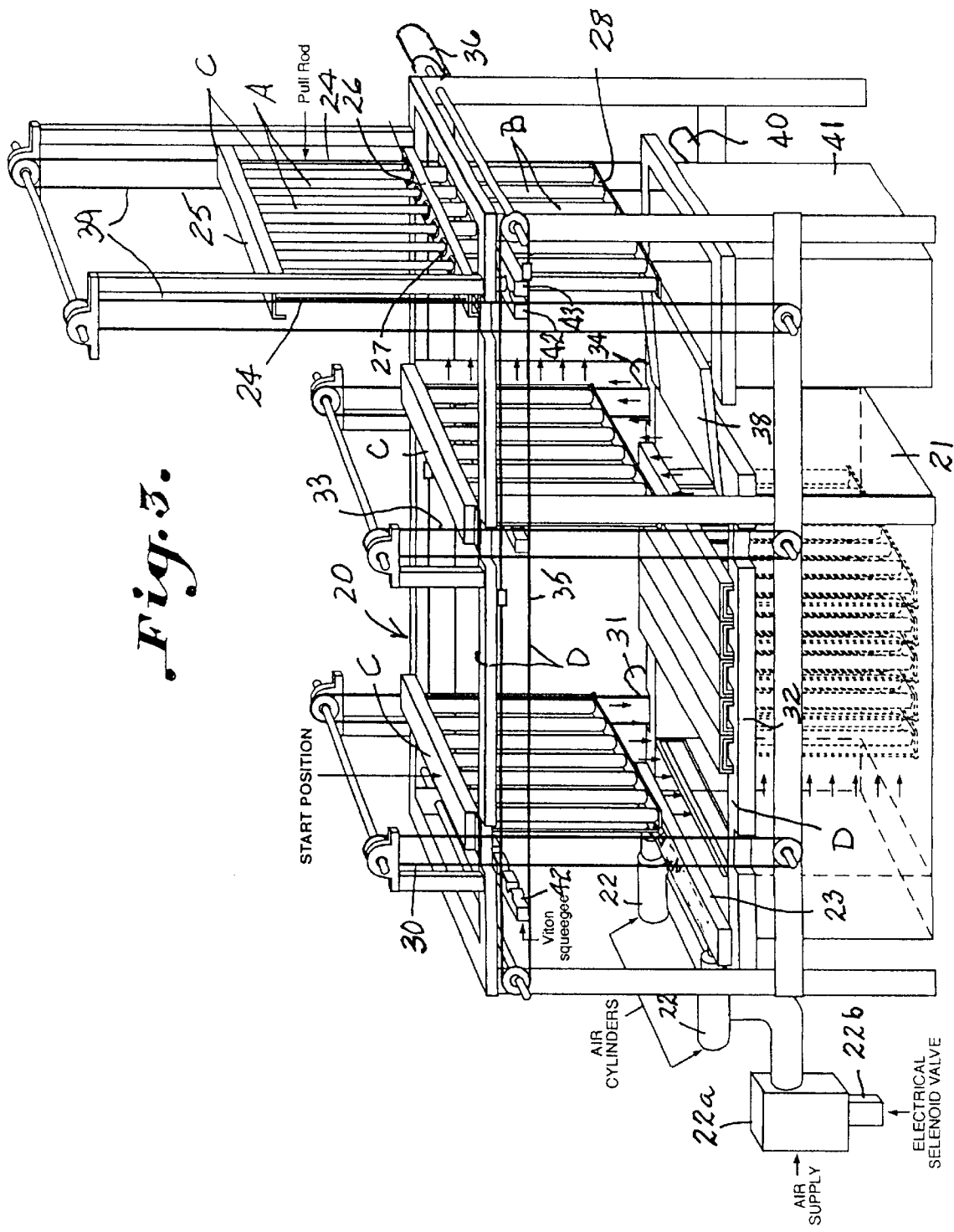

MAGNETIC APPARATUS FOR COLLECTING, CONVEYING AND RELEASING MAGNETIC MATERIALS AND METHOD

This is a Continuation-in-Part of application Ser. No. 09/046,756, filed Mar. 24, 1998 now U.S. Pat. No. 6,056,879 issued May 2, 2000.

BACKGROUND OF THE INVENTION

This invention relates to the removal of magnetic material especially magnetic particles from a liquid coolant after use in a machining operation.

U.S. Pat. No. 5,470,466 is representative of the prior art wherein use with a grinder is described by way of illustration. In the business of machining metal parts the coolant may be circulated from a relatively larger tank or a number of machine tools may be supplied from a single tank making it desirable to provide an automatic moving system for continuously removing and collecting magnetic material. The apparatus of U.S. Pat. No. 5,470,466 utilizes elongated permanent magnets constructed of magnetized segments. These elongated magnets are contained within elongated aligned covers of non-magnetic material from which the magnets must be withdrawn axially for releasing the magnetic material collected thereon.

While the invention is described in the context of extracting magnetic particles from coolant fluid it is to be understood that the invention may be utilized for any other purpose as where extraction or collection of magnetic particles is desired such as sweepers for collecting magnetic particles.

SUMMARY OF THE INVENTION

Accordingly, it is an important object of the present invention to provide a magnetic collection apparatus wherein an elongated permanent magnet is movable within a cover constructed of non-magnetic material so as to separate laterally from a collection area provided on a surface carried by the cover. When the magnet is moved laterally to a remote position the magnetic materials are released from the collection area or surface provided the magnet is removed from such proximity as to retain its attractive force over the magnetic particles to the extent that release of the particles is prevented.

Another important object of the invention is the provision of a conveyor operated system for transporting elongated bar magnets contained in liquid-proof covers constructed of non-magnetic material. Movement of the magnets within the respective covers may be achieved through the actuation of a handle or other suitable form of linkage or the cover may utilize a lateral passageway for containing the bar magnet arranged in such as a way to prevent tilting of the cover causing the bar magnet to be laterally transposed within the casing discharging material collected from the liquid or other medium with which the magnet is utilized.

Another important object of the invention is the provision of assemblies each having vertical non-magnetic covers for carrying elongated magnets. The assemblies may be arranged for sequential removal from the liquid for removal of particulate magnetic material collected thereon with subsequent return of the assemblies to the liquid for further removal of magnetic material.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2-A is a transverse front elevation of a lower portion of the assembly shown in FIG. 2 with parts broken away illustrating the transverse disposition of the magnets and cover assemblies in relation to the conveyor and tank containing coolant liquid.

FIG. 3 is a schematic left perspective view of apparatus including magnetic assemblies having vertical non-magnetic covers and magnets therein for collecting and removing magnetic particles.

DESCRIPTION OF A PREFERRED EMBODIMENT

The drawings illustrate an assembly and method for collecting and releasing magnetic materials including an elongated permanent magnet A. An elongated cover B is constructed from non-magnetic material in substantial alignment in a position closely adjacent to the magnet generally in superposed relation therewith to provide a collection area for the magnetic materials thereon opposite the magnet. Apparatus C is provided for separating the magnet to a more remote position in relation to the collection area of the elongated cover while maintaining a generally superposed relationship therebetween for releasing magnetic materials from the elongated cover. The magnet and the cover may be moved while in superposed closely adjacent relation for collecting magnetic material and thereafter separated by translatory motion for releasing magnetic material collected on the cover. A driven conveyor D may be included in the assembly for transporting the magnet and the cover through a coolant liquid containing magnetic materials in the form of particulate matter formed during a machining operation.

Figure 1:
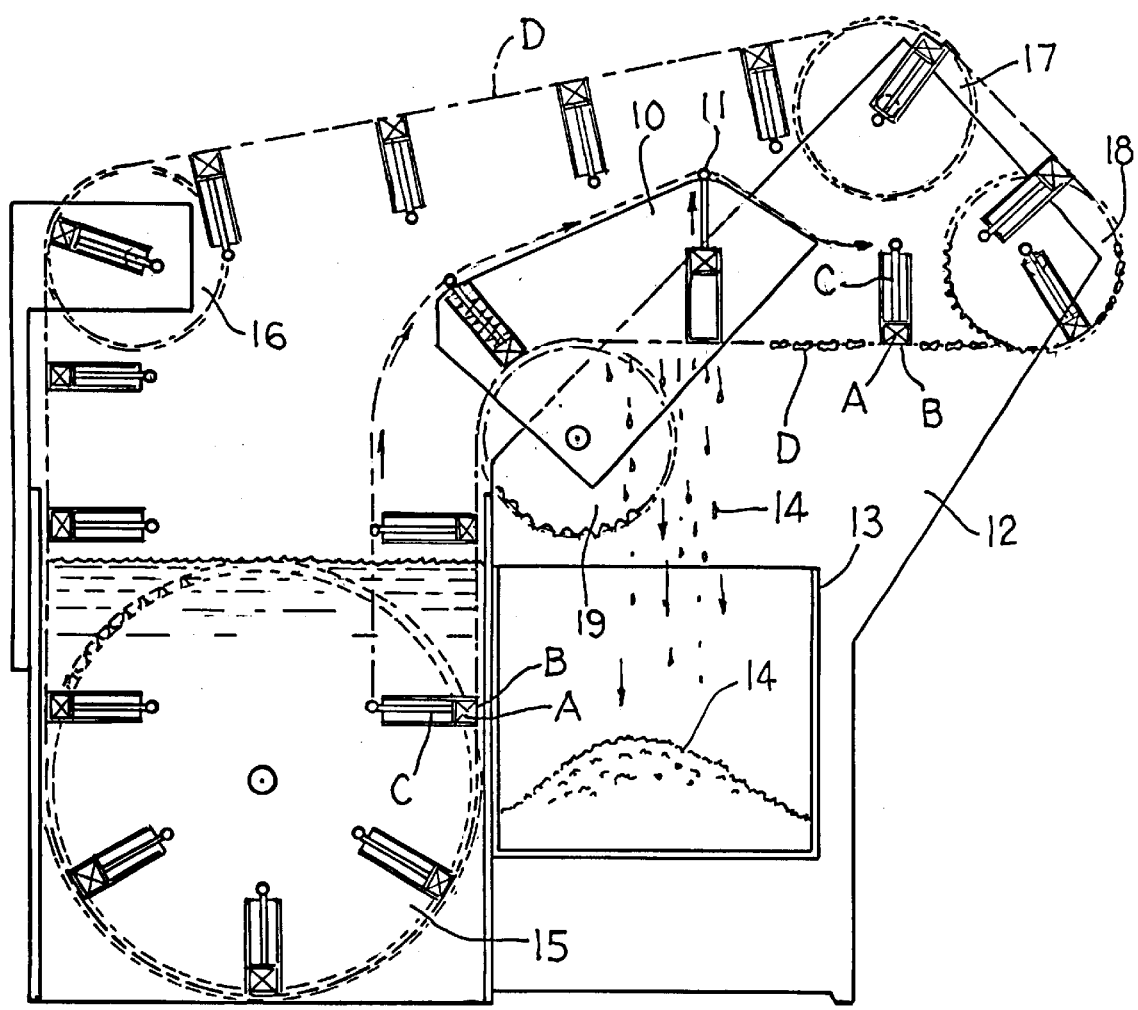
FIG. 1 is a schematic side elevation looking toward the right side of the apparatus which provides a conveyor for moving the magnets enclosed within the non-magnetic covers in a generally clockwise direction in FIG. 1.
Figure 2:
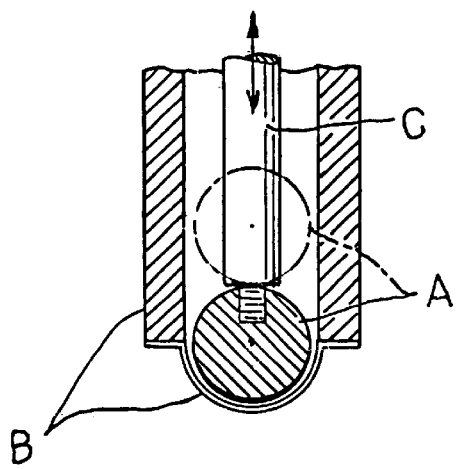
FIG. 2 is an enlarged sectional elevation of a cover and magnet assembly as illustrated in FIG. 1 looking toward a right-hand end of the assembly.
Figure 2A:
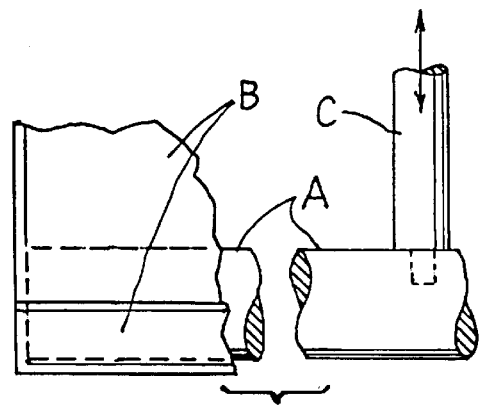

FIGS. 1, 2 and 2-A illustrate an assembly consisting of the elongated permanent magnet A carried within a substantially vertical cover B. A link C is operated by a cam 10 over which a transverse handle 11 passes and which acts as a cam follower. The cam 10 is illustrated as being carried by a suitable frame 12 which extends forwardly in FIG. 1 over a collection box 13. The magnetic particles 14 are collected in a pile within the box for recycling or discarding. It is an important advantage of the invention to avoid the use of filler paper and to permit extended use of the coolant fluid while avoiding contamination as the particles may be removed from the coolant fluid facilitating disposal of the fluid. The conveyor in FIG. 1 moves in a generally clockwise direction as is designated by the arrows. The conveyor includes endless chains adjacent to each side of the elongated frame 12 passing beneath the large sprocket 15 and thence over sprockets 16, 17 and 18 before passing over sprocket 19 and thence over the cam 10 for release of the particles by virtue of the magnet A be moved upwardly beneath the cover B by engagement with the handle 11.

It is thus seen that a versatile assembly has been provided wherein magnets are mounted within an elongated cover constructed of non-magnetic material. The magnets may be laterally moved away from the collection areas from magnetic materials permitting release thereof for collection and disposal.

FIG. 3 illustrates apparatus and method for collecting and releasing magnetic materials from a liquid including mounting a plurality of elongated vertical covers B constructed of non-magnetic material aligned in transversely spaced relation within a liquid containing magnetic material. Elongated permanent magnets A are positioned in vertical alignment with and in closely adjacent relation to the respective elongated covers forming an assembly collecting magnetic material from the liquid on the covers for the respective magnets of the assembly. Magnets and covers carrying magnetic material collected from the liquid are transported on a conveyor D to a position remote from the liquid. Thereafter, mechanically separating the magnets from the magnetic material collected on the elongated covers by apparatus C for releasing magnetic materials from the elongated covers by removing the magnets at least partially from the covers. Magnetic material released from the covers is collected at a location remote from the liquid. The magnets are moved upwardly by apparatus C in respect to said covers while wiping the magnetic materials from the covers. A plurality of the assemblies are sequentially positioned within the liquid in a tank; and sequentially removed from the tank preparatory to separating the magnets from the magnetic material.

The apparatus of FIG. 3 includes an elongated rectangular frame broadly designated at 20 positioned above an elongated tank 21 containing liquid such as coolant fluid which may flow generally from left to right. The frame 20 carries at a starting end a pair of air cylinders 22 actuating a pusher bar 23 for moving assemblies carrying transversely spaced covers B constructed of non-magnetic material containing upright magnets A movable mechanically by linkage including vertical rods 24. Further linkage including a horizontal frame member 25 supports the magnets A at an upper end. The covers B are carried by a horizontal member 26 carrying suitable sealing rings 27. A lower end of the covers are supported by horizontal members 28. The assemblies thus formed are lower to a starting position at the left-hand end of the frame upon upright endless drive members 30 driven by a motor 31. An assembly at the starting position is carried on a horizontal conveyor member 32 where the assemblies are sequentially arranged and pushed to the right by the bar 23 in response to the action of the air cylinders 22. The air cylinders are provided with a suitable air supply 22a operated by a solenoid valve 22b.

The magnetic assembly which has remained for the longest period of time partially submerged in the liquid is moved upwardly in an intermediate position in response to vertical drive members 33 which are driven by a motor 34. The assembly is moved from the intermediate position an upper conveyor D which includes a horizontal endless conveyor drive member 35 which is in turn driven by a motor 36. The assembly is moved up a ramp 38 and thence in position for the magnets A to be raised as by linkage C including the pull rods 24 by a vertical drive assembly including the endless drive members 39 which are driven by the motor 40. The particles collected are thereupon discharged into a receptacle 41 where they are collected for suitable disposal. This assembly is then returned to starting position on the conveyor.

It may be necessary, depending upon the size and nature of the particles and the viscosity of the fluid to wipe particles collected from the covers. This may be accomplished by closing the squeegee members 42 and 43 about the covers as the magnets are lifted.

While a preferred embodiment of the invention has been described using specific terms, such description is for illustrative purposes only, and it is to be understood that changes and variations may be made without departing from the spirit or scope of the following claims.

What is claimed is:

1. A method for collecting and releasing particulate magnetic material from a liquid comprising the steps of:

mounting a plurality of elongated vertical covers constructed of non-magnetic material in spaced relation within a liquid containing magnetic material;

positioning elongated permanent magnets in vertical alignment with and in closely adjacent relation to the respective elongated covers forming as assembly;

collecting magnetic material from the liquid on the covers of the respective magnets of assembly;

positioning a plurality of the assemblies in longitudinally spaced relation within the liquid in a tank;

transporting said assemblies forwardly within the tank on a power operated conveyor;

sequentially removing the assemblies from the tank preparatory to separating the magnets from the magnetic material;

transporting the magnets and covers carrying magnetic material collected from the liquid on said power operated conveyor to a position remote from the liquid;

thereafter mechanically separating the magnets from the magnetic material collected on the elongated covers for releasing magnetic material from the elongated covers by removing the magnets at least partially from the covers; and collecting magnetic material released from the covers.

2. The method set forth in claim 1 including arranging the covers in transversely spaced relation; moving said magnets upwardly in respect to said covers; and wiping the magnetic material from the covers.

* * * * *